United States Patent
Jouie et al.

(10) Patent No.: US 9,925,864 B2
(45) Date of Patent: *Mar. 27, 2018

(54) METHOD AND VALVE FOR VENTING A FUEL TANK

(71) Applicant: PLASTIC OMNIUM ADVANCED INNOVATION AND RESEARCH, Brussels (BE)

(72) Inventors: Sebastien Jouie, Compiegne (FR); Pierre Lacome, Lachelle (FR)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/903,998

(22) PCT Filed: Jul. 11, 2014

(86) PCT No.: PCT/EP2014/064952
§ 371 (c)(1),
(2) Date: Jan. 8, 2016

(87) PCT Pub. No.: WO2015/004277
PCT Pub. Date: Jan. 15, 2015

(65) Prior Publication Data
US 2016/0167508 A1 Jun. 16, 2016

(30) Foreign Application Priority Data
Jul. 12, 2013 (EP) .................................... 13176313

(51) Int. Cl.
*B60K 15/03* (2006.01)
*B60K 15/035* (2006.01)

(52) U.S. Cl.
CPC .................... *B60K 15/03519* (2013.01); *B60K 2015/03276* (2013.01); *B60K 2015/03528* (2013.01);
(Continued)

(58) Field of Classification Search
CPC ........... Y10T 137/309; Y10T 137/3099; Y10T 137/3084; Y10T 137/3093; B60K 15/03519; B60K 2015/03557
See application file for complete search history.

(56) References Cited

U.S. PATENT DOCUMENTS 6,957,658 B2 * 10/2005 Aschoff ............... B60K 15/035
137/202
8,267,113 B2 9/2012 Arnalsteen
(Continued)

FOREIGN PATENT DOCUMENTS

EP 2 647 516 B1 12/2014
WO WO 2012/100039 A1 7/2012

OTHER PUBLICATIONS

International Search Report dated Oct. 29, 2014, in PCT/EP2014/064952 filed Jul. 11, 2014.

*Primary Examiner* — Matthew W Jellett
(74) *Attorney, Agent, or Firm* — Oblon, McClelland, Maier & Neustadt, L.L.P.

(57) ABSTRACT

A valve including: a chamber configured to extend at least partly into a tank and to be connected via an upper venting aperture to a venting circuit; and a shut-off point defining a single maximum filling level within the tank, located away from the chamber, the shut-off point being in fluid communication with the chamber via a conduit, wherein the conduit includes a venting tube.

6 Claims, 2 Drawing Sheets

Figure 1:
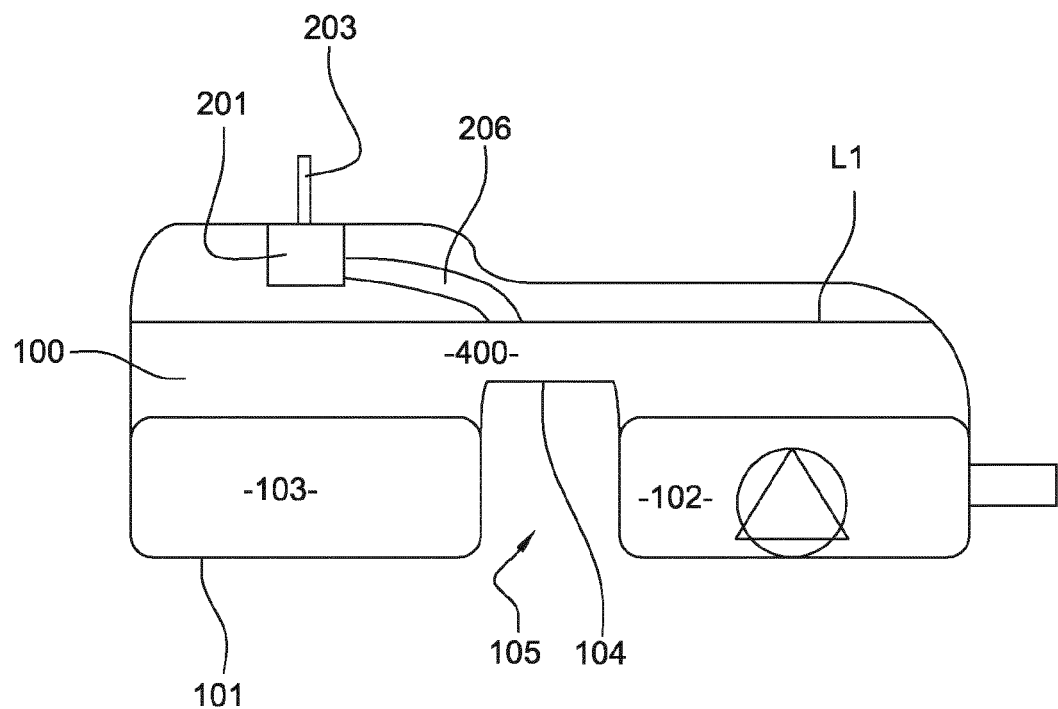

(52) U.S. Cl.
CPC ...... *Y10T 137/309* (2015.04); *Y10T 137/3084* (2015.04); *Y10T 137/3093* (2015.04); *Y10T 137/3099* (2015.04)

(56) References Cited

U.S. PATENT DOCUMENTS

| | | | |
|---|---|---|---|
| 8,763,646 B2* | 7/2014 | Kraemer | B60K 15/03519 137/202 |
| 8,910,675 B2* | 12/2014 | Coulon | B60K 15/03519 137/199 |
| 2005/0126633 A1 | 6/2005 | Leonhardt | |
| 2006/0032662 A1 | 2/2006 | Hosoya | |
| 2008/0190490 A1 | 8/2008 | Arnalsteen | |
| 2009/0065513 A1* | 3/2009 | Kraemer | B60K 15/03519 220/600 |
| 2010/0236640 A1* | 9/2010 | Erdmann | B60K 15/03519 137/197 |
| 2011/0068109 A1 | 3/2011 | Boecker et al. | |
| 2013/0298880 A1 | 11/2013 | Pifer et al. | |

\* cited by examiner

METHOD AND VALVE FOR VENTING A FUEL TANK

The present invention relates to a valve for the venting of a liquid tank, with which a motor vehicle may be equipped.

Most of the fuel tanks for motor vehicles are nowadays provided with a venting circuit. This circuit allows air to be introduced into the tank in the event of underpressure (especially for compensating for the volume of liquid consumed) or allows the gases contained in the tank to be removed in the event of overpressure (especially in the event of overheating). This circuit also allows the ducting and possible filtering of the gases that have to be discharged into the atmosphere, for the purpose of meeting the ever stricter environmental requirements in this regard.

The venting circuit generally includes a valve of the ROV (roll-over valve) type which as far as possible prevents liquid from coming out of the tank in the event of said tank rolling over or being at an excessively high angle of inclination. This valve must also respond rapidly and reliably when its intervention conditions occur, but with minimum sensitivity to abnormal phenomena such as especially a very high flow rate, overpressure in the tank or low-amplitude waves. This type of valve thus includes a vent function, a roll-over function and a liquid discrimination function.

The venting circuit may also include a valve of the FLV (fill limit valve) type which sets the maximum filling level of the tank. It provides thus the fill-limit function.

Some valves provide the functions from both an ROV and a FLV. They are called FLVV (fill limit vent valve).

Known FLVV comprise a chamber (i.e. body) that includes an orifice that functions as a shut-off point. The shut-off point is adapted to fix the maximum filling level, in the sense that the FLVV is configured to close, and thus cause the filling process to stop, when the level of liquid in the tank reaches the shut-off point.

With a view to optimizing the usage of the scarce space onboard a motor vehicle, car manufacturers have been equipping cars with fuel tanks of increasingly complex shapes. In some cases, the desired shape of the fuel tank cannot be reconciled with the need to place an FLVV of the known type at the desired fill level. It is an object of embodiments of the present invention to overcome this problem.

According to an aspect of the present invention, there is provided a valve comprising a chamber adapted to extend at least partly into a tank and adapted to be connected via an upper venting aperture to a venting circuit, and a shut-off point defining a single maximum filling level within the tank, located away from said chamber, said shut-off point being in fluid communication with the chamber.

The present invention is based inter alia on the insight of the inventor that by separating the physical location of the FLVV from the point at which the fill level is determined, the peculiarities of the shape of the fuel tank can be reconciled with the desired fill level. In particular, when the fuel tank has one or more elevations (i.e. pockets) in the top wall, the FLVV according to the invention can be placed within such an elevation, while the shut-off point that determines the fill level can reach down to any desired place under the top wall of the fuel tank, away from the elevation where the FLVV is placed.

In an embodiment of the valve according to the present invention, the chamber is made by injection moulding a plastic.

The valve, in particular the chamber, can be made by injection moulding a plastic. This is a particularly convenient way of producing a valve of sufficient strength.

In an embodiment of the valve according to the present invention, the shut-off point is in fluid communication with the chamber via a conduit. In particular, the open end of the conduit may constitute the shut-off point. In a particular embodiment, the conduit comprises a flexible tube. In another particular embodiment, the conduit can be formed by several sections of hollow bodies connected together in a leak tight manner.

It is an advantage of this embodiment that the desired maximum fill level can easily be fixed during installation of the valve by bending the conduit so as to arrange its open end at the desired height in the tank.

In a particular embodiment, the flexible tube is attached to a nipple provided on the valve. In a more particular embodiment, the nipple is made in one piece with the chamber.

It is an advantage of this embodiment that the main body of the valve, optionally including the nipple, can be produced as one piece (for instance by injection moulding), while a suitable conduit can be attached to it afterwards.

In an embodiment of the valve according to the present invention, an end of the conduit is provided with a feature (i.e. connecting element or part) shaped to facilitate welding to an inner wall of the tank.

It is an advantage of this embodiment that the fill level can be more accurately and stably fixed, by attaching the end of the conduit which constitutes the shut-off point at the appropriate height to the inside of the tank by welding.

In an embodiment, the valve according to the present invention comprises at least one semi-permeable membrane mounted inside the chamber such that it extends between the conduit and the upper venting aperture, the semi-permeable membrane being configured such that:
  it allows liquid vapour within the tank to flow from the conduit to the upper venting aperture; and
  it prevents liquid in the tank to flow from the conduit to the upper venting aperture.

It is an advantage of this embodiment that it avoids the transport of liquid fuel into the venting circuit, where it could oversaturate or damage the canister, if present, or be discharged in the environment.

In an embodiment, the valve according to the present invention comprises at least one bleed orifice.

It is an advantage of this embodiment that pressure spikes that may occur during events such as refueling can be mitigated.

According to an aspect of the present invention, there is provided a fuel tank equipped with a valve according to any one of the preceding claims.

In an embodiment, the fuel tank according to the present invention is of the saddle tank type.

Saddle fuel tanks are widely used for automotive applications. They are most frequently used with rear wheel drive or four wheel drive vehicles and they are designed to hold more fuel than a standard fuel tank.

Generally, saddle fuel tanks include two compartments for storage of fuel, which are connected together in a communicating manner by means of a bridge. The bridge provides an exterior concavity which is intended to provide accommodation for drive and/or exhaust components of the vehicle to pass freely therethrough.

Saddle tanks include a main (or primary) compartment and a secondary compartment, and include a transfer system that is in charge of transferring the liquid from the secondary compartment into the main compartment by mean of the fuel pump. This transfer system is continuously active as soon as the fuel pump is active, which means as soon as the contact is on.

The transfer system implies that in a regular vehicle usage, the secondary compartment will have liquid in only if the main compartment is full. This configuration will lead to a so called "regular filling".

However, an important transverse acceleration of the vehicle can transfer an important mass of liquid from the main compartment into the secondary compartment by mean of its own inertia submitted to this acceleration. If the contact is off at this moment, it results some liquid in the secondary compartment (possibly up to the level of the bridge) while the main compartment isn't full (possibly totally empty). This configuration will lead to a so called "rental-car filling".

Hence, the valve of the present invention is particularly suitable for use with a saddle tank, the geometry of which calls for additional flexibility in the positioning of the FLVV. The valve body may be position in an elevated position above in of the two compartments of the saddle tank, while the end of the conduit that determines the fill level may be arranged above the bridge between the two compartments.

According to an aspect of the present invention, there is provided a motor vehicle equipped with a fuel tank as described above.

According to an aspect of the present invention, there is provided use of the valve as described above for venting a fuel tank, the valve extending at least partly into the tank and being connected via the upper venting aperture to the venting circuit, the shut-off point being situated inside the tank.

The technical effects and advantages of embodiments of the fuel tank and the use according to the present invention correspond mutatis mutandis to those of the corresponding embodiments of the valve according to the present invention.

Unpublished European patent application EP 12162989.3 in the name of the present applicant, the teaching of which is incorporated herein by this reference, describes a valve comprising a chamber provided with a cover, which extends at least partly into the tank and is connected via an upper venting aperture to a venting circuit; first means for monitoring a level of liquid in the primary compartment; and second means for monitoring a level of liquid in the secondary compartment; the valve being configured to be closed when said first means detect that the level of liquid in the primary compartment is equal to or higher than a first predetermined filling level and said second means detect that the level of liquid in the secondary compartment is equal to or higher than a second predetermined filling level.

Figure 2:
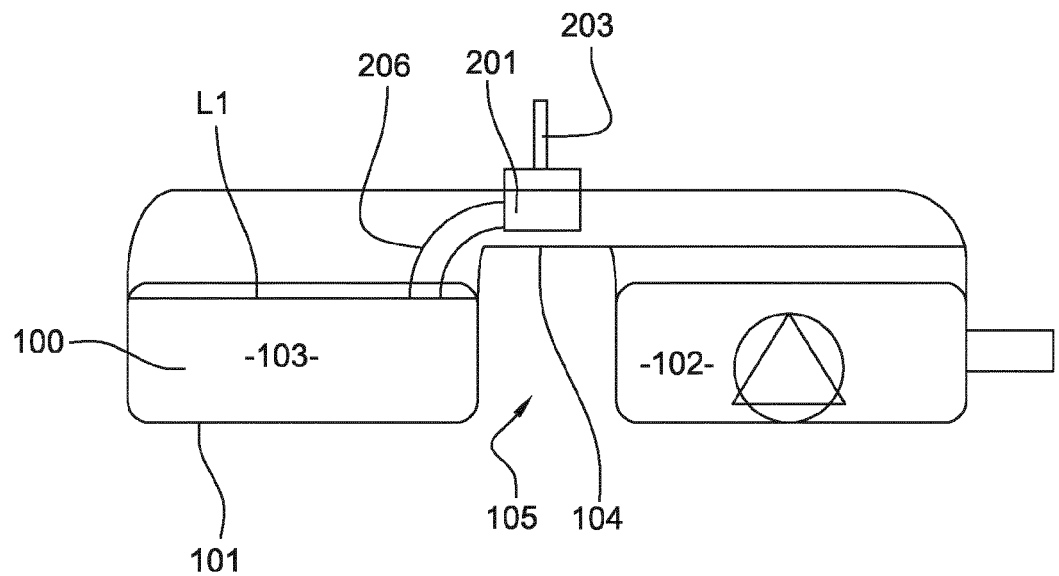
Figure 3:
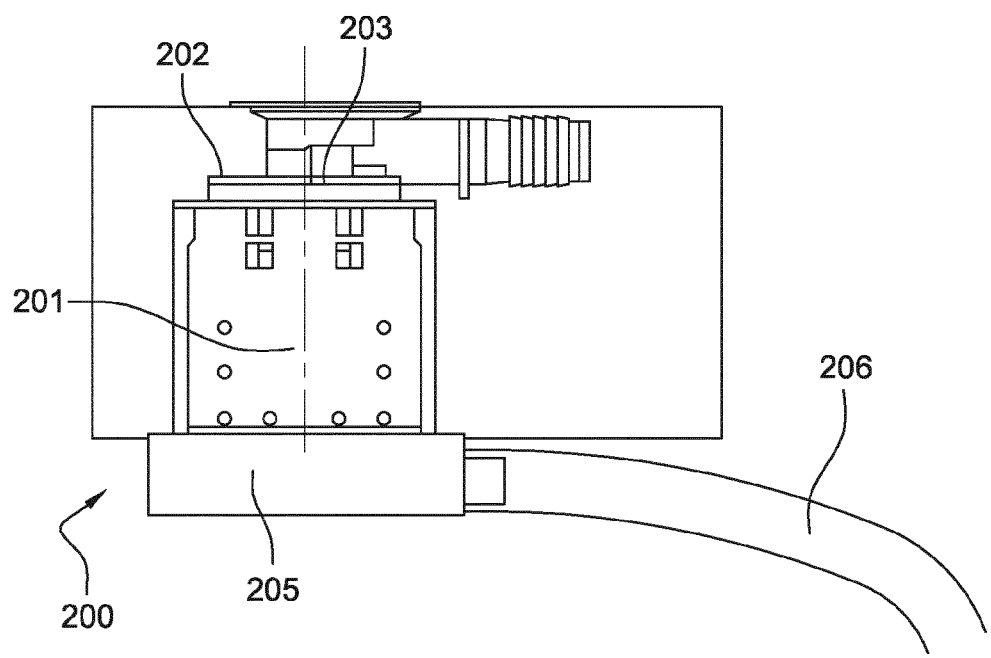
Figure 4:
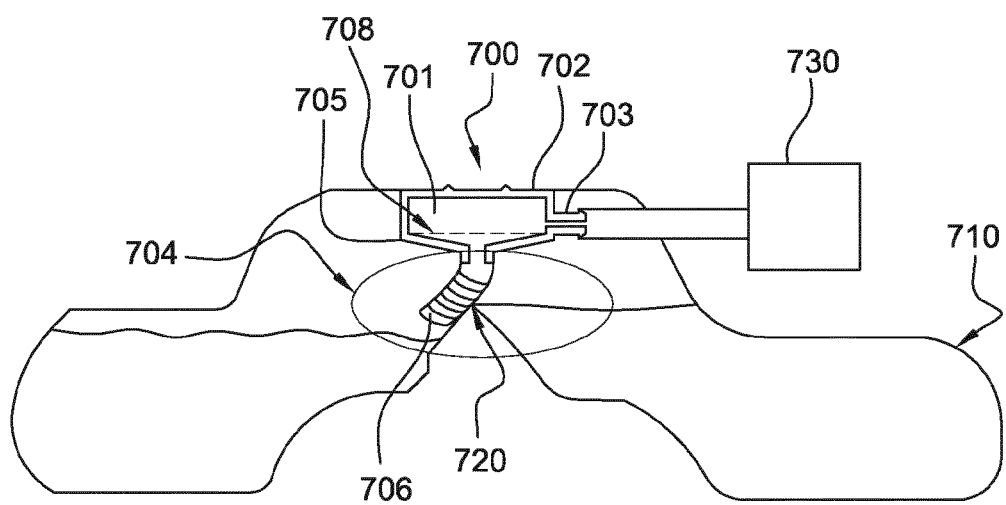

These and other features and advantages of embodiments of the present invention will now be described in more detail with reference to the accompanying drawings, in which:

FIG. 1 schematically illustrates a fuel tank equipped with a valve according to an embodiment of the present invention, arranged in an upper protrusion provided in one compartment of a saddle tank;

FIG. 2 schematically illustrates a fuel tank equipped with a valve according to an embodiment of the present invention, arranged above the bridge of a saddle tank;

FIG. 3 schematically illustrates a valve according to an embodiment of the present invention in more detail; and FIG. 4 schematically illustrates a fuel tank equipped with a valve according to another embodiment of the present invention, configured for liquid/vapor separation.

The valve according to the present invention is equipped with a shut-off point defining a single maximum filling level within the tank, located away from the valve chamber. The shut-off point is in fluid communication with the chamber. The valve thus provides means for monitoring the fuel level, which confer on it the ability to impose a predetermined filling level. Refueling of the tank is possible until the shut-off level is not reached. When the shut-off level is reached, the valve takes a closed position.

By the term "closed" is meant the fact that the communication between the inner volume of the tank and the upper venting aperture is obstructed/no longer active so that the tank can no longer be vented by the valve.

The valve is intended for the venting circuit of a tank that may contain any liquid. In particular, the liquid may be a fuel, a brake fluid or a lubricant. More particularly, the liquid is a fuel. The tank may be intended for any use, especially for equipping a vehicle and even more especially for equipping a motor vehicle.

The valve according to the invention comprises a chamber of any shape, usually of constant internal cross section. It preferably has a substantially cylindrical internal cross section. In an advantageous embodiment, it is provided with a cover that is pierced by an orifice preferably intended to be sealed by a float or any other sealing device preferably providing a ROV function as explained above.

For a given tank having a given maximum filling volume, it is possible to advantageously set the shut-off level of the valve according to the invention below the level of the bridge in order to make a new filling volume version requirement out of the same tank. For example, considering a tank with a maximum filling volume of 85 litres (with fill level above the level of the bridge), it is possible to reduce this maximum filling volume to 78 litres (with fill level below the level of the bridge), by setting appropriately the predetermined filling level below the top of the bridge.

In a preferred embodiment, the valve is mounted within the tank such that its chamber extends above the bridge. The on-board diagnostic (OBD) for detecting leaks in the fuel system requires the valve (that makes the tank to communicate with the canister) to be opened. The advantage of the configuration where the chamber of the valve extends above the bridge is that the valve can remain open at an excessively high angle of inclination of the tank, provided that the maximum filling level of the tank is not reached.

The shut-off point may be constituted by a conduit having one extremity (also called hereafter "inlet") which opens into the tank at a level which corresponds to the predetermined filling level, and another extremity (also called hereafter "outlet") which opens into the chamber. Throughout the description, the conduit will also be referred to as a "venting tube". The valve is a mono-port valve, i.e. a valve equipped with one gas inlet (i.e. the extremity of the conduit that opens into the tank).

The gas inlet is located away from the chamber of the valve, so as to extend at the desired level in the tank. The functional dimensions of the conduit are its inner section (which will set a pressure drop between the two extremity of the tubes, and the velocity of the fluids inside the tubes) and the height of its inlets (which will set the predetermined fill level). Such architecture is compact and easy to implement. The term "gas" is understood in particular to mean the external air that has to be introduced into the tank or the gas mixtures contained in the tank, the removal of which has to be possible. In the case of a fuel tank, these gas mixtures comprise essentially air, and fuel vapour.

Advantageously, the valve comprises a base designed for supporting the venting tube and for connecting it to the chamber of the valve. The base according to the invention may have any shape. It preferably has a substantially cylindrical internal cross section. Preferably, this base is a cup shape part, with a flat bottom. Advantageously, the base is designed to be clipped onto the chamber. In this manner, an existing FLVV may be used in conjunction with a base to form a valve according to the present invention.

In another embodiment, the base comprises a threaded portion designed to be screwed on a corresponding threaded portion of the chamber. The venting tube is placed in communication (i.e. connected) with the chamber of the valve via a common aperture (i.e. the lower aperture of the chamber which corresponds to the upper aperture in the cup shaped base).

In consequence, the flow of gas through this common aperture is possible until the lower extremity (i.e. the extremity that opened into a compartment) of the venting tube is closed by the liquid.

Advantageously, the base and a nipple for receiving the venting tubes forms one block. This architecture is compact and facilitates mounting/dismounting operations. In another particular embodiment, this one block also includes the chamber.

In order to work properly, the valve must be entirely tight from the inlet to the outlet. Otherwise there will be overfilling.

In a preferred embodiment, the inlet section of the tubes extends horizontally (with respect to the bottom of the tank) in order to have a clear and precise shut-off.

The tube is preferably flexible, such that it can be arranged in any desired position without difficulty. For example, the tube can have internal section comprised between 200 mm$^2$ and 250 mm$^2$.

In a preferred embodiment, the base and the nipple for attaching the venting tube are made by injection moulding a plastic.

In a preferred embodiment, the venting tube is made of plastic. The term "plastic" is understood to mean any polymeric synthetic material, whether thermoplastic or thermosetting, which is in the solid state under ambient conditions, as well as blends of at least two of these materials.

The main function of the valve according to the invention is the fill-limit function, but advantageously, the valve according to the invention can include a roll-over function, a venting function and a liquid discrimination function. These functions can be implemented by using a device comprising a float within a housing with a spring or ball below it in order to make the float closing before 90° rotation. On the top of the float there is a seal (preferably elastomeric or plastic) that seals the vent orifice in the top part of the housing when the float is in shut position.

FIGS. 1 and 2 depict a sectional schematic view of a saddle fuel tank 100 having a tank shell 101. The tank shell 101 comprises a primary compartment 102, a secondary compartment 103 and a dome 400. The primary compartment 102 and the secondary compartment 103 are connected together in a communicating manner by means of a bridge 104. The bridge provides an exterior concavity 105 which is intended to provide accommodation for drive and/or exhaust components of the vehicle to pass freely underneath.

A valve 200 is disposed within the fuel tank 100. Preferably, the valve 200 is positioned at the centre of the tank (FIG. 2), such that it extends above the bridge 104.

FIG. 3 shows a valve 200 according to an embodiment of the present invention. The valve 200 comprises a chamber 201. The chamber 201 of the illustrated valve is provided with a cover 202, which may either be moulded as one part with said chamber or it may form a separate part joined to the latter by any known means (mechanical fastening with a seal; welding etc.). This cover 202 is advantageously connected to a venting circuit via an aperture 203. For example, the aperture 203 is connected through a conduit to the inlet of a storage canister (not illustrated). The storage canister has an outlet conduit adapted for connection to the air inlet of an engine.

The base 205 is fixed to the chamber by any known means (clips, screws . . . ). The base 205 is advantageously connected to (i.e. in communication with) the chamber 201 via an aperture. One extremity of the venting tube opens onto the base 205 and another extremity of the venting tube opens onto the volume of the tank. The open extremity corresponds to the shut-off level or the predetermined filling level L1. In a preferred embodiment, the base 205 and the venting tube 206 are made of plastic.

As shown in FIGS. 1 and 2, the valve 200 according to a preferred embodiment of the present invention is designed to respond by taking a fully closed position when a fuel level in the tank 100 is equal to or higher than the predetermined filling level L1.

With reference to FIG. 2, the predetermined filling level L1 is lower than the physical maximum filling level of the left compartment 103, which would correspond to the level of the top of the bridge 104.

As will be described below, the valve 200 according to a preferred embodiment of the present invention comprises means for providing both the ROV function and the FLVV function.

Advantageously, the valve according to the invention further comprises means which confer on it the ability to act as a pressure liquid vapour separator.

In the embodiment shown in FIG. 4, the valve 700 is disposed within the fuel tank 710. Preferably, the valve 700 is positioned at the centre of the tank, such that it extends above the bridge 720. The valve 700 comprises a chamber 701. The chamber 701 of the valve is provided with a cover 702. This cover 702 is advantageously connected to a venting circuit via an aperture 703. In the example of FIG. 4, the aperture 703 is connected through a conduit to the inlet of a storage canister 730.

In this example, the valve 700 further comprises a refueling vent block 704. The refueling vent block 704 comprises a base 705 designed to be mounted at the bottom of the chamber 701 and a venting tube 706 in charge of monitoring a level of fuel in a compartment of the tank.

Advantageously, the valve 700 further comprises a semipermeable membrane 708 mounted inside the chamber 701 such that it extends between the first 706 venting tube and the aperture 703. The membrane 708 is configured such that:
  it allows liquid vapour within the tank to flow from the conduit to the aperture; and
  it prevents liquid in the tank to flow from the conduit to the aperture.

Thus, the membrane 708 allows only fuel vapour to be transferred to the canister 730 so as to avoid contamination and pass through to the atmosphere.

Advantageously, the valve further comprises a small bleed orifice. For example, this bleed orifice is bored on the venting tube. The bleed orifice is used to minimize pressure spike at valve shut-off, in order to mitigate any fuel rising rapidly up the fill pipe and exiting the pipe as a result. This bleed orifice could be tuned to optimize refueling performance. The valve can comprise other bleed orifices placed at strategic locations, such as in an optional refueling vent block.

While the invention has been described hereinabove with reference to specific embodiments, this is done to clarify and not to limit the invention, the scope of which is to be determined on the basis of the accompanying claims.

The invention claimed is:

1. A fuel tank comprising:
    a first compartment and a second compartment;
    a bridge between the compartments; and
    a valve comprising:
        a chamber configured to extend at least partly into a tank and configured to be connected via an upper venting aperture to a venting circuit; and
        a shut-off point defining a single maximum filling level within the tank, located away from the chamber, the shut-off point being in fluid communication with the chamber,
    wherein the shut-off point is in fluid communication with the chamber via a conduit,
    wherein the conduit comprises a venting tube, and
    wherein one end of the conduit is located below a top of the bridge.

2. The tank according to claim 1, wherein plastic is injection molded into a shape of the chamber.

3. The fuel tank according to claim 1, wherein the venting tube is a flexible tube.

4. The fuel tank according to claim 3, wherein the flexible tube is attached to a nipple provided on the valve.

5. The fuel tank according to claim 4, wherein the nipple is made in one piece with the chamber.

6. The fuel tank according to claim 1, further comprising at least one semi-permeable membrane mounted inside the chamber to extend between the conduit and the upper venting aperture, the semi-permeable membrane configured to:
    allow liquid vapor within the tank to flow from the conduit to the upper venting aperture; and
    prevent liquid in the tank to flow from the conduit to the upper venting aperture.

* * * * *